(12) United States Patent
Kim et al.

(10) Patent No.: US 12,526,036 B2
(45) Date of Patent: Jan. 13, 2026

(54) METHOD AND APPARATUS FOR BEAM ALIGNMENT USING DIRECTION OF ATTENTION

(71) Applicant: ELECTRONICS AND TELECOMMUNICATIONS RESEARCH INSTITUTE, Daejeon (KR)

(72) Inventors: Young-Hoon Kim, Daejeon (KR); Seon-Ae Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 18/792,674

(22) Filed: Aug. 2, 2024

(65) Prior Publication Data

US 2025/0047360 A1  Feb. 6, 2025

(30) Foreign Application Priority Data

Aug. 2, 2023  (KR) .................. 10-2023-0100984
Jul. 19, 2024  (KR) .................. 10-2024-0095920

(51) Int. Cl.
*H04B 7/08* (2006.01)
*H04B 7/06* (2006.01)
(Continued)

(52) U.S. Cl.
CPC ......... *H04B 7/086* (2013.01); *H04B 7/06958* (2023.05); *H04W 36/06* (2013.01); *H04W 72/046* (2013.01)

(58) Field of Classification Search
CPC .. H04B 7/086; H04B 7/06958; H04B 7/0619; H04W 36/06; H04W 72/046; H04W 16/28
See application file for complete search history.

(56) References Cited

U.S. PATENT DOCUMENTS 9,413,441 B2   8/2016  Kim et al.
9,839,047 B2   12/2017 Kwon et al.
(Continued)

FOREIGN PATENT DOCUMENTS

CN      116224216 A    6/2023
KR  10-2021-0124660 A  10/2021

OTHER PUBLICATIONS

Byung-Jae Kwak et al., "Random Jitter Beamforming for Point-And-Link Communications", 2012 IEEE Statistical Signal Processing Workshop (SSP), pp. 496-499, Aug. 5-8, 2012.
(Continued)

*Primary Examiner* — Sophia Vlahos
(74) *Attorney, Agent, or Firm* — Rabin & Berdo, P.C.

(57) ABSTRACT

A method of a transmitting node may comprise: exchanging, with a receiving node, configuration information for beam direction search; generating DoA measurement request frames based on the configuration information; transmitting the DoA measurement request frames to the receiving node through a coarse beam in a partitioned area selected among partitioned areas within a beam search range, in a transmission occasion of the DoA measurement request frames based on the configuration information; receiving a DoA measurement response message from the receiving node; identifying whether the receiving node is located within the selected partitioned area based on DoA information included in the DoA measurement response message; and in response to the receiving node being located within the selected partitioned area, changing a beam direction for beam alignment based on the DoA information.

20 Claims, 10 Drawing Sheets

(51) Int. Cl.
*H04W 36/06* (2009.01)
*H04W 72/044* (2023.01)

(56) References Cited

U.S. PATENT DOCUMENTS

| | | | |
|---|---|---|---|
| 9,941,586 | B2 | 4/2018 | Seol et al. |
| 10,236,946 | B2 | 3/2019 | Park et al. |
| 10,314,003 | B2* | 6/2019 | Wang ............... G01S 13/876 |
| 10,966,181 | B2 | 3/2021 | Gheorghiu et al. |
| 11,245,442 | B1 | 2/2022 | Foo et al. |
| 12,057,919 | B2* | 8/2024 | Horn ................. H04W 16/28 |
| 12,066,555 | B1* | 8/2024 | Busser ................ G01S 3/043 |
| 12,164,044 | B2* | 12/2024 | Smith ................... G01S 3/12 |
| 2014/0070996 | A1* | 3/2014 | Kneckt ............ H04W 64/006 |
| | | | 342/417 |
| 2015/0341090 | A1 | 11/2015 | Oh et al. |
| 2021/0184744 | A1* | 6/2021 | Pezeshki ............ H04L 5/0048 |

OTHER PUBLICATIONS

Junyi Wang et al., "Beam Codebook Based Beamforming Protocol for Multi-Gbps Millimeter-Wave WPAN Systems", IEEE Journal on Selected Areas in Communications, vol. 27, No. 8, pp. 1390-1399, Oct. 2009.

* cited by examiner

METHOD AND APPARATUS FOR BEAM ALIGNMENT USING DIRECTION OF ATTENTION

CROSS-REFERENCE TO RELATED APPLICATIONS

This application claims priority to Korean Patent Applications No. 10-2023-0100984, filed on Aug. 2, 2023, and No. 10-2024-0095920, filed on Jul. 19, 2024, with the Korean Intellectual Property Office (KIPO), the entire contents of which are hereby incorporated by reference.

BACKGROUND

1. Technical Field

The present disclosure relates to a beam alignment technique in a wireless communication system, and more particularly, to a beam alignment technique using a direction of attention.

2. Related Art

Recently, wireless communication systems, such as IEEE Wi-Fi 802.11 standards and 3GPP's 5G NR mobile communication standards, have adopted technologies that use multiple antennas to form beams in specific directions to expand coverage or increase capacity. To this end, wireless communication systems with multiple antennas employ various beamforming and beam management technologies. These technologies are evolving and are subdivided into different aspects, including beamforming, beam measurement, beam reporting, and beam management.

In general, beamforming between two wireless devices requires a procedure to find the optimal beam between them. Therefore, a transmitter forms beams in various directions using multiple antennas, while a receiver uses multiple antennas to receive these beams. To find the optimal beam, the receiver may estimate an angle of arrival (AoA) of a radio signal received from the transmitter or perform beam sweeping within a certain search area to find a beam with the maximum received signal. Methods of detecting a beam direction through this and aligning beam directions between the transmitter and receiver are used.

The AoA estimation technique, which is one of the techniques for aligning the beam directions between the transmitter and receiver, may use complex methods such as Multiple Signal Classification (MUSIC) or Estimation of Signal Parameters via Rotational Invariance Technique (ESPRIT). Another technique for aligning the beam directions between the transmitter and receiver involves matching or aligning beams by performing beam sweeping within a certain search area to find a beam with the maximum received signal. However, such techniques for selecting one of several pre-formed beams within a certain search area or finding a desired beam direction by performing beam sweeping may involve a complex procedure of exchanging beam measurement values between the two devices to determine the optimal beam.

To address this issue, a method using a codebook has been proposed. The codebook-based method involves partitioning a physical search area into multiple areas and performing predefined beamforming for the respective partitioned areas. In this case, a codebook may be designed for predefined beamforming to facilitate faster beam alignment or beam searching. Therefore, the method using a codebook has the advantage of reducing complexity and not increasing system overhead for exchanging control information, compared to the techniques of estimating AoA and/or angle of departure (AoD) or obtaining channel state information (CSI). However, the codebook-based method has the limitation of not being able to accurately align the beams.

SUMMARY

The present disclosure for resolving the above-described problems is directed to providing a method and an apparatus for accurate beam alignment with reduced complexity.

A method of a transmitting node, according to an exemplary embodiment of the present disclosure for achieving the above-described objective, may comprise: exchanging, with a receiving node, configuration information for beam direction search; generating direction of attention (DoA) measurement request frames based on the configuration information; transmitting the DoA measurement request frames to the receiving node through a coarse beam in a partitioned area selected among partitioned areas within a beam search range, in a transmission occasion of the DoA measurement request frames based on the configuration information; receiving a DoA measurement response message from the receiving node; identifying whether the receiving node is located within the selected partitioned area based on DoA information included in the DoA measurement response message; and in response to the receiving node being located within the selected partitioned area, changing a beam direction for beam alignment based on the DoA information, wherein the DoA information includes a DoA measurement value obtained by measuring correlations with sequences included in the DoA measurement request frames and a relative direction value indicating a misaligned direction of the DoA measurement request frames.

The configuration information may further include at least one of a number of the partitioned areas within the beam search range, information on a first partitioned area in which the DoA measurement request frames are to be transmitted, or information on partitioned area selection criteria.

The configuration information may further include global positioning system (GPS) location information of the transmitting node and GPS location information of the receiving node.

When the DoA measurement value is equal to or greater than a preset threshold, the receiving node may be determined to be located within the selected partitioned area.

The changing of the beam direction for beam alignment may comprise: mapping the DoA measurement value to previously-stored relative angle(s); in response to two mapped relative angles existing, determining a direction of a relative angle using the relative direction value included in the DoA information; and adjusting the beam direction by the relative angle of the determined direction from a beam direction in which the DoA measurement request frames are transmitted.

The generating of the DoA measurement request frames may comprise: generating a first signal, a second signal, and a third signal for transmission to a partitioned area within the beam search range; and generating the DoA measurement request frames by mapping the first signal to frequency resources of a first symbol, and equally mapping the second signal and the third signal to frequency resources of the second symbol.

The first symbol and the second symbol may be consecutive symbols, the second signal may be mapped to odd-numbered frequency resources of the second symbol, and the third signal may be mapped to even-numbered frequency resources of the second symbol.

The DoA measurement request frames may be respectively transmitted through a first beam transmitted to a center of the selected partitioned area, a second beam deviated by a predetermined angle to a right of the first beam within the selected partitioned area, and a third beam deviated by the predetermined angle to a left of the first beam within the selected partitioned area.

The method may further comprise: transmitting information on the changed beam direction to the receiving node.

A method of a receiving node, according to an exemplary embodiment of the present disclosure for achieving the above-described objective, may comprise: exchanging, with a transmitting node, configuration information for beam direction search; receiving direction of attention (DoA) measurement request frames through a coarse beam in an occasion based on the configuration information; calculating a DoA measurement value obtained by measuring the received DoA measurement request frames and a relative direction value indicating a misaligned direction of the DoA measurement request frames; transmitting a DoA measurement response message including the DoA measurement value and the relative direction value to the transmitting node; and communicating with the transmitting node based on the DoA measurement response message.

The method may further comprise: receiving, from the transmitting node, beam direction information for the communication; and performing reception beamforming to receive a first signal from the transmitting node and transmission beamforming to transmit a second signal to the transmitting node based on the beam direction information.

A transmitting node, according to an exemplary embodiment of the present disclosure for achieving the above-described objective, may comprise at least one processor, and the at least one processor causes the transmitting node to perform: exchanging, with a receiving node, configuration information for beam direction search; generating direction of attention (DoA) measurement request frames based on the configuration information; transmitting the DoA measurement request frames to the receiving node through a coarse beam in a partitioned area selected among partitioned areas within a beam search range, in a transmission occasion of the DoA measurement request frames based on the configuration information; receiving a DoA measurement response message from the receiving node; identifying whether the receiving node is located within the selected partitioned area based on DoA information included in the DoA measurement response message; and in response to the receiving node being located within the selected partitioned area, changing a beam direction for beam alignment based on the DoA information, wherein the DoA information includes a DoA measurement value obtained by measuring correlations with sequences included in the DoA measurement request frames and a relative direction value indicating a misaligned direction of the DoA measurement request frames.

The configuration information may further include at least one of a number of the partitioned areas within the beam search range, information on a first partitioned area in which the DoA measurement request frames are to be transmitted, or information on partitioned area selection criteria.

The configuration information may further include global positioning system (GPS) location information of the transmitting node and GPS location information of the receiving node.

The at least one processor may further cause the transmitting node to perform: in response to the DoA measurement value being equal to or greater than a preset threshold, determining that the receiving node is located within the selected partitioned area.

In the changing of the beam direction for beam alignment, the at least one processor may further cause the transmitting node to perform: mapping the DoA measurement value to previously-stored relative angle(s); in response to two mapped relative angles existing, determining a direction of a relative angle using the relative direction value included in the DoA information; and adjusting the beam direction by the relative angle of the determined direction from a beam direction in which the DoA measurement request frames are transmitted.

In the generating of the DoA measurement request frames, the at least one processor may further cause the transmitting node to perform: generating a first signal, a second signal, and a third signal for transmission to a partitioned area within the beam search range; and generating the DoA measurement request frames by mapping the first signal to frequency resources of a first symbol, and equally mapping the second signal and the third signal to frequency resources of the second symbol.

The first symbol and the second symbol may be consecutive symbols, the second signal may be mapped to odd-numbered frequency resources of the second symbol, and the third signal may be mapped to even-numbered frequency resources of the second symbol.

The DoA measurement request frames may be respectively transmitted through a first beam transmitted to a center of the selected partitioned area, a second beam deviated by a predetermined angle to a right of the first beam within the selected partitioned area, and a third beam deviated by the predetermined angle to a left of the first beam within the selected partitioned area.

The at least one processor may further cause the transmitting node to perform: transmitting information on the changed beam direction to the receiving node.

According to exemplary embodiments of the present disclosure, when performing beamforming between a transmitting node and a receiving node, the transmitting node may partition a search area into multiple partitioned areas, select one partitioned area among the multiple partitioned areas, and determine a fine beam direction within the determined partitioned area. In determining the fine beam direction, the transmitting node may transmit a beam of a reference direction and a right beam and a left beam, each deviated from the reference direction by a pre-determined angle. This allows the receiving node to ascertain how much and in which direction a received beam is deviated from the reference direction. Then, the receiving node may transmit beam measurement value and deviation angle information to the transmitting node. By utilizing the information received from the receiving node, the transmitting node can achieve more precise beam alignment.

Furthermore, the transmitting node can provide beam direction information to the receiving node. This enables the receiving node to perform both reception beamforming and transmission beamforming without separate beam direction searching, thereby allowing for faster communication.

DETAILED DESCRIPTION OF THE EMBODIMENTS

Figure 1:
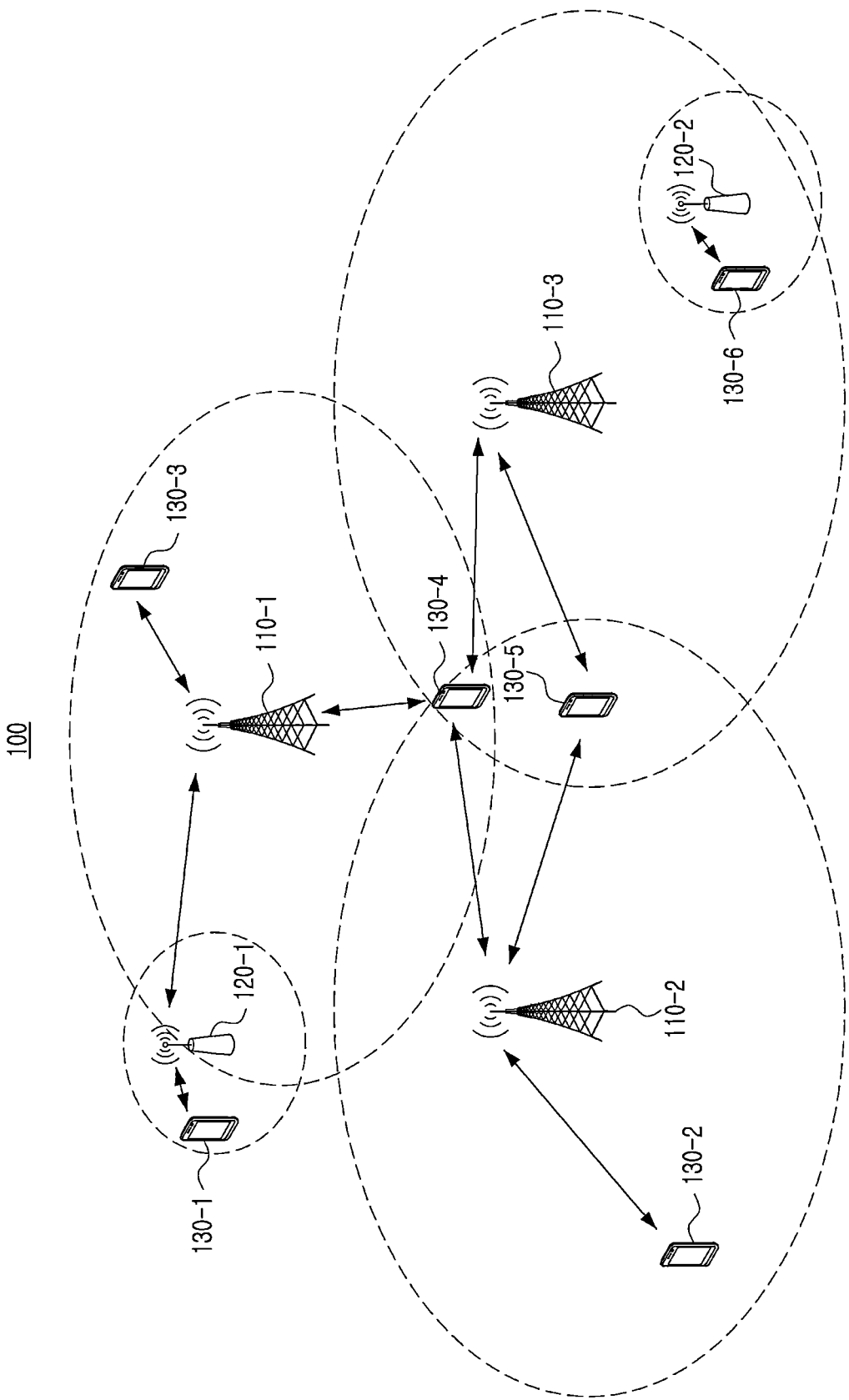
FIG. 1 is a conceptual diagram illustrating an exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g. 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g. long term evolution (LTE), LTE-advanced (LTE-A)), 5G communication (e.g. new radio (NR)), 6G communication, etc. specified in the 3rd generation partnership project (3GPP) standards. The 4G communication may be performed in frequency bands below 6 GHZ, and the 5G and 6G communication may be performed in frequency bands above 6 GHz as well as frequency bands below 6 GHz.

For example, in order to perform the 4G communication, 5G communication, and 6G communication, the plurality of communication may support a code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform spread OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter bank multi-carrier (FBMC) based communication protocol, universal filtered multi-carrier (UFMC) based communication protocol, space division multiple access (SDMA) based communication protocol, orthogonal time-frequency space (OTFS) based communication protocol, or the like.

Further, the communication system 100 may further include a core network. When the communication 100 supports 4G communication, the core network may include a serving gateway (S-GW), packet data network (PDN) gateway (P-GW), mobility management entity (MME), and the like. When the communication system 100 supports 5G communication or 6G communication, the core network may include a user plane function (UPF), session management function (SMF), access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
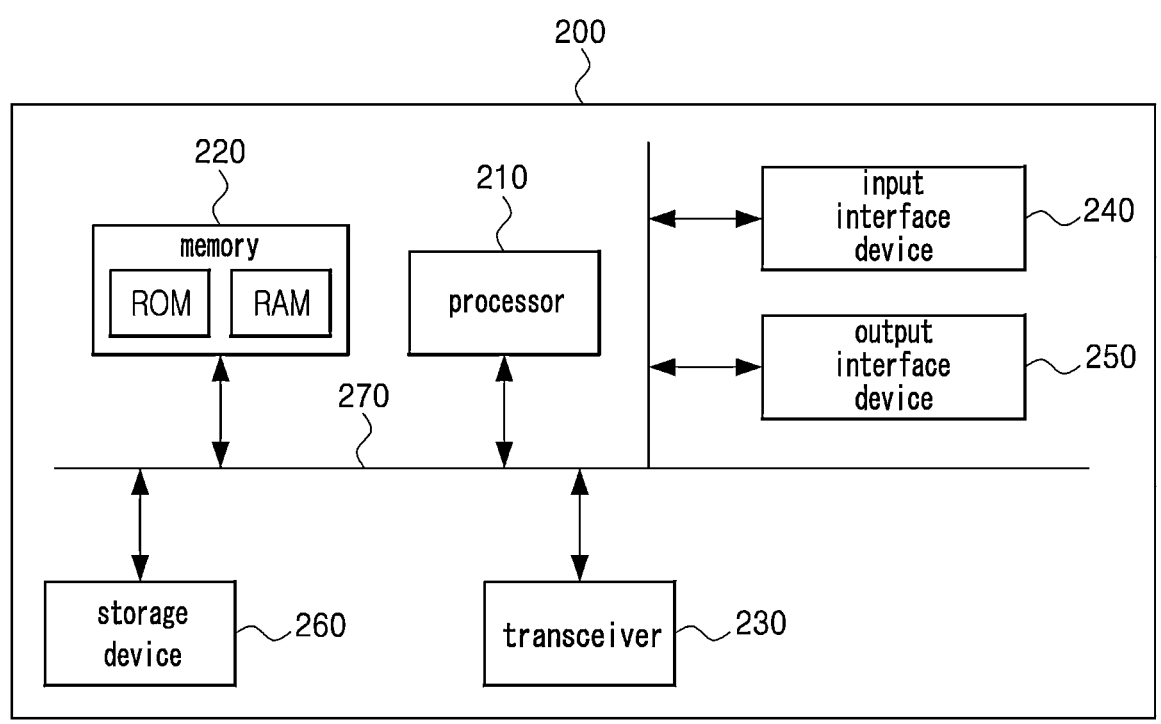
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), evolved Node-B (eNB), gNB, base transceiver station (BTS), radio base station, radio transceiver, access point, access node, road side unit (RSU), radio remote head (RRH), transmission point (TP), transmission and reception point (TRP), or the like.

Each of the plurality of terminals 130-1, 130-2, 130-3, 130-4, 130-5, and 130-6 may refer to a user equipment (UE), terminal, access terminal, mobile terminal, station, subscriber station, mobile station, portable subscriber station, node, device, Internet of Thing (IoT) device, mounted module/device/terminal, on-board device/terminal, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g. a single-user MIMO (SU-MIMO), multi-user MIMO (MU-MIMO), massive MIMO, or the like), coordinated multipoint (COMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the COMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission and reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Meanwhile, the present disclosure relates to techniques for providing methods and apparatuses for beam alignment between a transmitter and a receiver in a wireless communication system using beamforming technology. The beamforming technology is used not only in mobile communication systems as described in FIG. 1 and FIG. 2, but also in various wireless communication technologies, including satellite communication systems and WiFi-based wireless communication systems. Therefore, the beamforming technology described in the present disclosure is not limited to any specific system.

Recently, a method and apparatus have been proposed that allow a target device receiving a transmission beam from a user device to estimate a relative angle between the transmission beam and the target device through simple measurements. According to this method, the transmitting device may form a beam of a main beam direction towards the target device, form two additional beams deviated by a certain angle to the left and right of the main beam direction, and determine a beam direction based on correlations between the additional beams and the main beam. However, this method has the limitation that the target device needs to be within a line of sight (LOS) of the user device in a visible range. Thus, it's difficult to apply such methods to general wireless communication systems.

Therefore, the present disclosure aims to provide a method that can be used in wireless communication systems and offers a fast and accurate beam alignment technique. The method according to the present disclosure will be described with reference to the accompanying drawings.

Figure 3A:
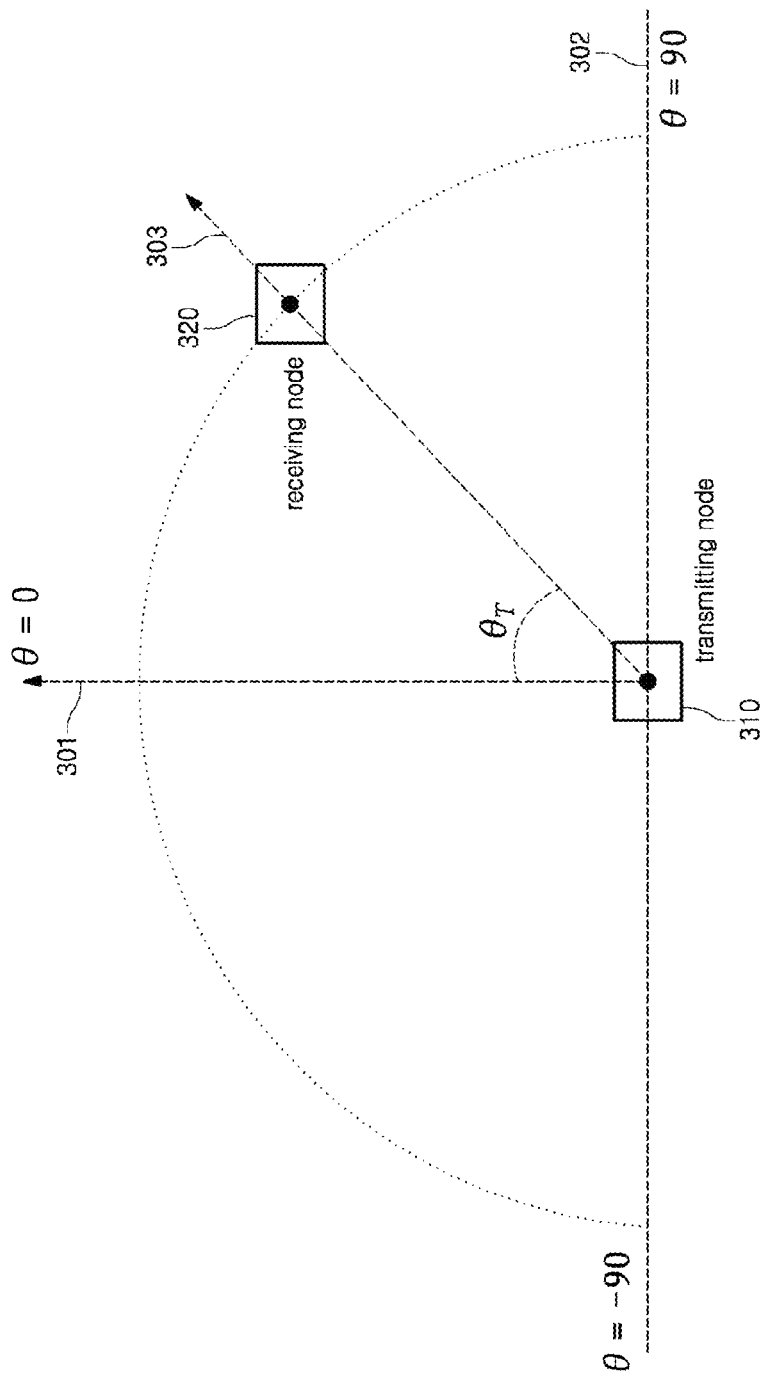
FIG. 3A is a conceptual diagram illustrating a relationship between an absolute polar coordinate system for beam alignment between a transmitting node to a receiving node and a direction of the receiving node.

FIG. 3A is a conceptual diagram illustrating a relationship between an absolute polar coordinate system for beam alignment between a transmitting node to a receiving node and a direction of the receiving node.

FIG. 3A illustrates a transmitting node 310 and a receiving node 320. The transmitting node 310 may refer to a wireless communication device capable of transmitting signals using beamforming technology, while the receiving node 320 refers to a wireless communication device capable of receiving beamformed signals. In the description of FIG. 3A and in the present disclosure described below, the transmitting node 310 may be understood as a communication device that performs a task of transmitting signals (or frames or sequences) for beam alignment to the receiving node 320 through beamforming. In addition, the receiving node 320 may be understood as a device that receives and measures the beamformed signals and transmits measurement information back to the transmitting node 310.

The transmitting node 310 and receiving node 320 may be applied to various wireless communication systems. For example, if both the transmitting node 310 and the receiving node 320 are communication devices used in the cellular wireless communication system previously described in FIG. 1, each of them may be a base station, terminal, user equipment (UE), or the like. Alternatively, if the transmitting node 310 and receiving node 320 are used in a WiFi system, each of them may be a station, access point (AP), or the like. They may also be applied to satellite communication systems or various IoT devices such as drones.

In the case of cellular systems, the transmitting node 310 may be a base station (e.g. eNB or gNB), while the receiving node 320 may be a UE or an IoT device. In the case of sidelink communication, the transmitting node 310 and the receiving node 320 may both be UEs or IoT devices. In the case of WiFi system, the transmitting node 310 may be an AP, and the receiving node 320 may be various devices equipped with WiFi capabilities. Examples of such devices include computers, laptop computers, notebook computers, smartphones, smartwatches, and smart glasses. Additionally, the technology may be applied to various fields such as Bluetooth systems, non-terrestrial network communication systems, and other areas.

Each of the transmitting node 310 and receiving node 320 may include all or part of the components described in FIG. 2. In addition to the components exemplified in FIG. 2, each of the transmitting node 310 and receiving node 320 may also include additional devices. These additional devices may include various types of sensors, devices for receiving satellite signals, and/or devices for user convenience. Furthermore, the transmitting node 310 may include functional components to search for a direction of the receiving node 320 according to the present disclosure. The functional components included in the transmitting node 310 will be described in more detail with reference to the accompanying drawings. The receiving node 320 may also include functional components for receiving signals (or sequences or frames) from the transmitting node 310 and for measuring direction-related information and providing direction information based on measurements to the transmitting node 310. The functional components included in the receiving node 320 will also be described in more detail with reference to the accompanying drawings.

All or at least some of the functional components included in the transmitting node 310 and receiving node 320 may be implemented by the processor 210 described in FIG. 2.

Referring to FIG. 3A, an example is illustrated where the receiving node 320 is located at a point spaced from the transmitting node 310 by a certain distance, centering a location of the transmitting node 310. When the transmitting node 310 wishes to transmit a signal to the receiving node 320 through beamforming, the transmitting node 310 needs to be able to determine an angle $\theta_T$ by which a direction of the receiving node 320 is deviated from a predetermined reference direction 301. Therefore, the present disclosure describes methods for the transmitting node 310 to determine the direction of the receiving node 320 or the angular deviation $\theta_T$ from the reference direction 301 for beam alignment.

First, the present disclosure assumes that the transmitting node 310 and receiving node 320 share an absolute polar coordinate system as illustrated in FIG. 3A. The absolute polar coordinate system shared between the transmitting node 310 and receiving node 320 may be configured by a system or configured by mutual agreements.

As illustrated in FIG. 3A, the absolute polar coordinate system may include the reference direction 301, and the receiving node 320 may know the reference direction 301 when it receives information on the absolute polar coordinate system from the transmitting node 310. If the reference direction 301 of the absolute polar coordinate system is configured as the north direction by the system or standard specifications, the transmitting node 310 may not provide information on the absolute polar coordinate system to the receiving node 320 during an initial setup procedure. The present disclosure assumes that the transmitting node 310 and receiving node 320 share information on the absolute polar coordinate system information in some manner.

The transmitting node 310 may define the reference direction 301 as 0 degrees, with directions to the right of the reference direction defined as positive angles and directions to the left of the reference direction defined as negative angles. According to the example in FIG. 3A, a search area (or search range) may be configured from 90 degrees ($\theta=90°$) to the right and −90 degrees ($\theta=-90°$) to the left of the reference direction.

The present disclosure describes methods for the transmitting node 310 to determine the direction $\theta_T$ of the receiving node 320 from the reference direction 301 when the transmitting node 310 does not know the location of the receiving node 320. In addition, the present disclosure described below will describe a method where the transmitting node 310 searches for the direction of the receiving node within the search area configured from −90° to 90° relative to the reference direction 301. The method and apparatus for the transmitting node 410 to search for the direction of the single receiving node 320 will be described. However, such description is merely for convenience, and the same method may be used to search for directions of multiple receiving nodes. Although the search range will be limited to −90° to 90° for description purposes, the present disclosure may also apply to various search ranges, such as those wider or narrower than 180°.

Figure 3B:
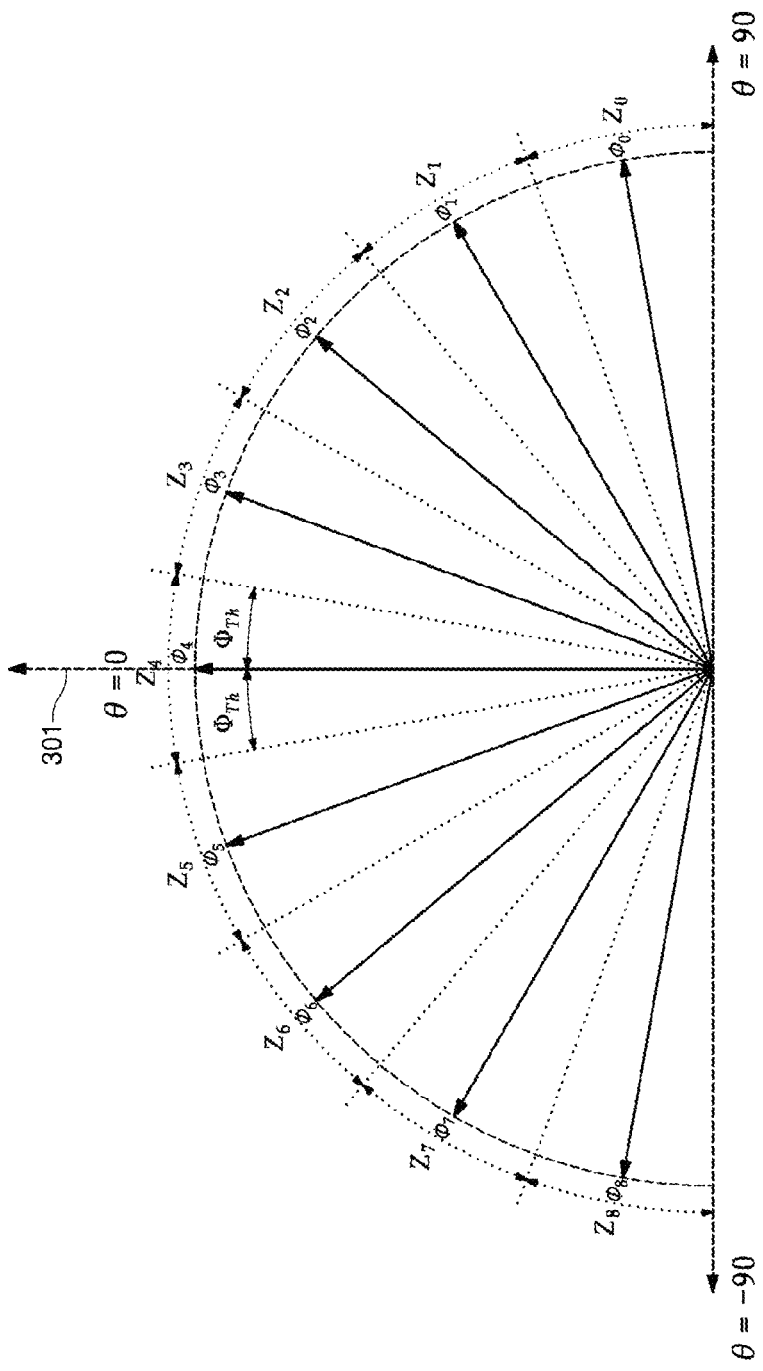
FIG. 3B is a conceptual diagram illustrating a case where a transmitting node forms beams by partitioning a configured search area into an arbitrary number of partitioned areas.

FIG. 3B is a conceptual diagram illustrating a case where a transmitting node forms beams by partitioning a configured search area into an arbitrary number of partitioned areas.

Referring to FIG. 3B, an exemplary embodiment is shown where the transmitting node 310 partitions a search area configured from −90° to 90° into an arbitrary number of partitioned areas, for example, 9 partitioned areas (e.g. $Z_0$, $Z_1$, $Z_2$, $Z_3$, $Z_4$, $Z_5$, $Z_6$, $Z_7$, $Z_8$). The partitioned areas $Z_0$, $Z_1$, $Z_2$, $Z_3$, $Z_4$, $Z_5$, $Z_6$, $Z_7$, and $Z_8$ may all have the same angular range. In other words, since the 180° search area is divided into 9 partitioned areas, each partitioned area may have a range of 20°. The transmitting node 310 may provide information on the search area and the number of partitioned areas to the receiving node 320 during the initial setup procedure. Thus, from information on the search area and the number of partitioned areas, the receiving node 320 may determine the range of each partitioned area.

The transmitting node 310 may form coarse beams $\phi_0$, $\phi_1$, $\phi_2$, $\phi_3$, $\phi_4$, $\phi_5$, $\phi_6$, $\phi_7$, and $\phi_8$ in the respective central directions of the partitioned areas. Therefore, the coarse beams $\phi_0$, $\phi_1$, $\phi_2$, $\phi_3$, $\phi_4$, $\phi_5$, $\phi_6$, $\phi_7$, and $\phi_8$ may be formed within the partitioned areas $Z_0$, $Z_1$, $Z_2$, $Z_3$, $Z_4$, $Z_5$, $Z_6$, $Z_7$, and $Z_8$, respectively. For example, the coarse beam $\phi_4$ in the reference direction 301 may be formed within an angle $\Phi_{Th}$ from the reference direction 301 to a boundary of the corresponding partitioned area. More specifically, the coarse beam $\phi_4$ formed in the partitioned area $Z_4$, to which the reference direction 301 belongs, may be formed within a range from an angle $\Phi_{Th}$ to the left boundary of the partitioned area to an angle $\Phi_{Th}$ to the right boundary of the partitioned area. In this case, the angles to the left and right boundaries of the partitioned area from the reference direction 301 may have the same value $\Phi_{Th}$. This is because each coarse beam is formed in the central direction within the corresponding partitioned area.

Therefore, once the search range is determined, and the number of partitioned areas is determined, the angle $\Phi_{Th}$ from the formed beam to the boundary of the corresponding partitioned area may be determined as a specific value. In another example, once the search range is determined and the angle $\Phi_{Th}$ is determined, the number of partitioned areas may be determined as a specific value. In the present disclosure, it is assumed that the number of partitioned areas and the angle $\Phi_{Th}$ are preset.

In the above description, it was assumed that information on the search range and the number of partitioned areas is shared between the transmitting node 310 and the receiving node 320. Instead of the search range, the transmitting node 310 and the receiving node 320 may share information on the number of partitioned areas and the angle $\Phi_{Th}$ with each other. Through this, the receiving node 320 may also identify the search range. Additionally, information on the number of partitioned areas and the angle $\Phi_{Th}$ may be defined in a specific codebook form. When the information on the number of partitioned areas and the angle $\Phi_{Th}$ are defined in a specific codebook form, the transmitting node 310 and the receiving node 320 may share the information on the number of partitioned areas and the angle $\Phi_{Th}$ by sharing a codebook based on a mapping between the number of partitioned areas and the angle $\Phi_{Th}$.

In another example, depending on a type of application service, there may be cases where it is not necessary to share information on the number of partitioned areas and the angle $\Phi_{Th}$ between the transmitting node 310 and the receiving node 320. However, in the present disclosure, in order to facilitate understanding, it is assumed that information on the number of partitioned areas and the angle $\Phi_{Th}$ is shared between the transmitting node 310 and the receiving node 320.

Meanwhile, in FIG. 3B, the example where the partitioned areas do not overlap with each other is illustrated. However, at least some of the partitioned areas may be configured to overlap at least partially with adjacent partitioned areas.

Figure 3C:
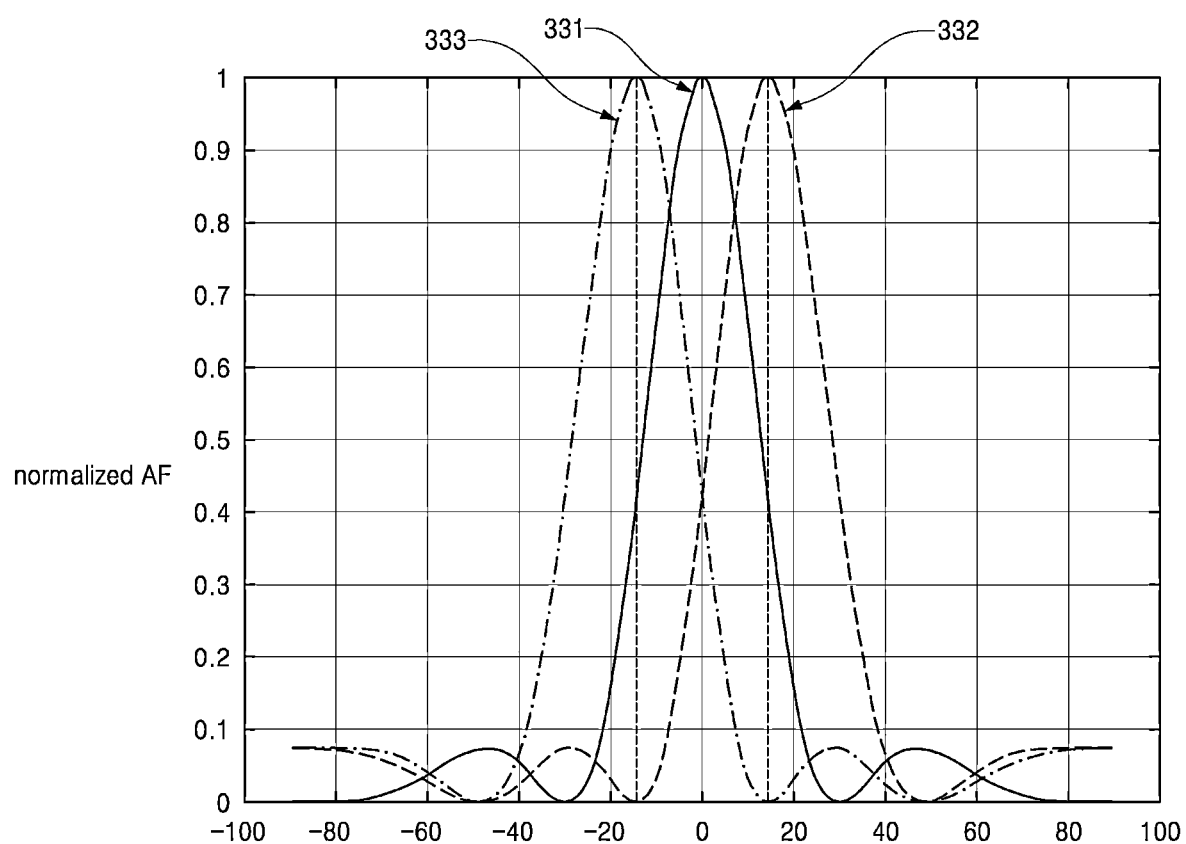
FIG. 3C is a graph simulating beamforming and a normalized array factor for a relative angle when a transmitting node has a uniform linear array (ULA) type antenna.

FIG. 3C is a graph simulating beamforming and a normalized array factor for a relative angle when a transmitting node has a uniform linear array (ULA) type antenna.

The transmitting node 310 may have a uniform linear array (ULA) type antenna. The ULA type antenna may have a form where antenna elements with the same characteristics are arranged at uniform intervals. In this case, each of the antenna elements may be configured in a cross-polarization (X-pol) form or may be configured in a single polarization form.

Referring to FIG. 3C, the vertical axis represents a normalized array factor (AF), and the horizontal axis may represent an angle of a search range. In addition, the search range may be a range from −90° to 90° as described in FIGS. 3A and 3B. In the present disclosure, three different beams may be used. The first beam may be a beam formed in the reference direction 301 using the ULA-type antenna for a beam alignment signal (or sequence). Hereinafter, the first beam is indicated with a reference numeral 331.

The second beam may be a beam formed in a direction tilted by a preset angle to the right from the reference direction 301 of FIG. 3B, within a boundary angle $\Phi_{Th}$ of the partitioned area. Hereinafter, the second beam is indicated with a reference numeral 332. The third beam may be a beam formed in a direction tilted by a preset angle to the left from the reference direction 301 of FIG. 3B, within another boundary angle $\Phi_{Th}$ of the partitioned area. Hereinafter, the third beam is indicated with a reference numeral 333. In this case, the tilted (separated) angle between the first beam 331 and the second beam 332 may be set to have the same value as the tilted (separated) angle between the first beam 331 and the third beam 333.

The transmitting node 310 may transmit the first beam 331, the second beam 332, and the third beam 333 to the receiving node 320. Correspondingly, the receiving node 320 may receive the first beam 331, the second beam 332, and the third beam 333 from the transmitting node 310. The receiving node 320 may then generate beam information regarding the first beam 331, the second beam 332, and the third beam 333 and provide the beam information to the transmitting node 310.

The beam information that the receiving node 320 transmits to the transmitting node 310 may be information on a direction of attention (DoA) (i.e. DoA information). The DoA will be described in more detail with reference to the accompanying drawings.

In an exemplary embodiment of the present disclosure, when the first beam 331, the second beam 332, and the third beam 333 are applied to the OFDM wireless communication system, each of the first beam 331, the second beam 332, and the third beam 333 may be allocated in the frequency domain. In the OFDM wireless communication system, a method in which the transmitting node 310, using an array antenna comprising M antennas, generates the first beam 331, the second beam 332, and the third beam 333 may be as follows.

The first beam 331 which is the reference beam, may be generated by Equation 1 below, and the second beam 332, which is the right-side beam of the first beam 331, and the third beam 333, which is the left-side beam of the first beam 331, may be generated by Equation 2 below. Here, the meaning of 'generating the first beam 331, the second beam 332, and the third beam 333' may imply that the beams are respectively formed in the directions described in FIG. 3C.

$$X_{k,m}^{ref} = X_k, k \in P, m = 1, \ldots, M \quad [\text{Equation 1}]$$

$$X_{k,m}^{SRJB} = \begin{cases} X_{k,m}^{L} = X_k \cdot w_{L,m}^*, & k \in P_L, m = 1, \ldots, M \\ X_{k,m}^{R} = X_k \cdot w_{R,m}^*, & k \in P_R, m = 1, \ldots, M \end{cases} \quad [\text{Equation 2}]$$

In Equations 1 and 2, m indicates the m-th antenna among the total of M antennas, k indicates a subcarrier, ref indicates the reference beam (i.e. first beam 331), and P indicates a frequency resource location with an OFDM symbol, where the reference beam is allocated. In Equations 1 and 2, $X_k$ indicates preamble symbols that are pre-known or pre-defined between the transmitting node 310 and the receiving node 320. Therefore, $X_{k,m}^{ref}$ defined in Equation 1 may indicate a symbol transmitted through the k-th subcarrier and m-th antenna, which forms the first beam 331.

In Equation 2, L indicates the left-side beam (i.e. third beam 333) of the first beam 331, and R indicates the right-side beam (i.e. second beam 332) of the first beam 331. In addition, in Equation 2, $w_{L,m}$ indicates a weight for the third beam 333, and $w_{R,m}$ indicates a weight for the second beam 332. For example, the weight $w_{L,m}$ for the third beam 333 and the weight $w_{R,m}$ for the second beam 332 may use values based on a spatial random jitter beam forming (SRJBF) scheme. In another example, the weight $w_{L,m}$ for the third beam 333 and $w_{R,m}$ for the second beam 332 may be weight values that steer the beams such that an AF of each beam becomes ½ of the maximum value of the AF when a relative angle δ between the second beam 332 and the third beam 333 is 0. Here, ½ is merely one example for a value used for steering, and other values such as ⅔, 0.7, or 0.75 may also be used.

In addition, X* refers to a complex conjugate of X. Therefore, $X_{k,m}^L$ in Equation 2 may refer to a symbol transmitted through the k-th subcarrier and m-th antenna that forms the left-side beam 333 of the first beam 331, and $X_{k,m}^R$ may refer to a symbol transmitted through the k-th subcarrier and m-th antenna that forms the right-side beam 332 of the first beam 331.

In addition, $X_{k,m}^{SRJB}$ in Equation 2 may refer to an SRJBF-applied symbol (or sequence), which is transmitted through the k-th subcarrier and the m-th antenna. The SRJBF scheme is a technique that has the effect of reducing a beam width without increasing the number of antennas, and it can spatially distinguish the opposite node in the user's look direction in a target recognition field. The second beam 332 and the third beam 333 described in the present disclosure may be formed based on beam patterns pre-designed according to the SRJBF scheme, in other words, weight values for the respective antennas.

In the present disclosure, when applying the SRJBF scheme, the frequency domain resources (i.e. subcarriers) for the second beam 332 and the third beam 333 may be configured not to overlap. As a method to prevent the overlapping of the subcarriers for the second beam 332 and the third beam 333, odd-numbered subcarriers may be allocated to one beam, and even-numbered subcarriers may be allocated to the other beam.

According to the above-described scheme, $P_L$ and $P_R$ defined in Equation 2 may respectively indicate the locations to which the left-side beam and the right-side beam are allocated in the frequency resource of the OFDM symbol, and they do not overlap with each other. In other words, an intersection of $P_L$ and $P_R$ may be an empty set, and a union of $P_L$ and $P_R$ may be equal to frequency resources P of the reference beam (i.e. first beam 331) in the OFDM symbol.

The transmitting node 310 may perform a two-step search to quickly and accurately determine the direction of the receiving node 320 within the range of −90° to 90°, as illustrated in FIG. 3B.

In the first step, the transmitting node 310 may identify one partitioned area where the receiving node 320 is located among a predetermined number of partitioned areas for the search of the receiving node 320. In the second step, the transmitting node 310 may search for (or determine) a detailed direction within the partitioned area where the receiving node 320 is located.

Referring to FIGS. 3A and 3B to describe the two-step search, the transmitting node 310 may first identify which of 9 partitioned areas the receiving node 320 is located in. Then, the transmitting node 310 may search for a detailed direction within the partitioned area where the receiving node 320 is located. Describing the second step again, as illustrated in FIG. 3A, the transmitting node 310 may search for the direction 303 where the receiving node 320 is located or the direction $\theta_T$ of the receiving node 320 from the reference direction 301.

In the following description, functional components of the transmitting node 310 described above will be described.

Figure 4:
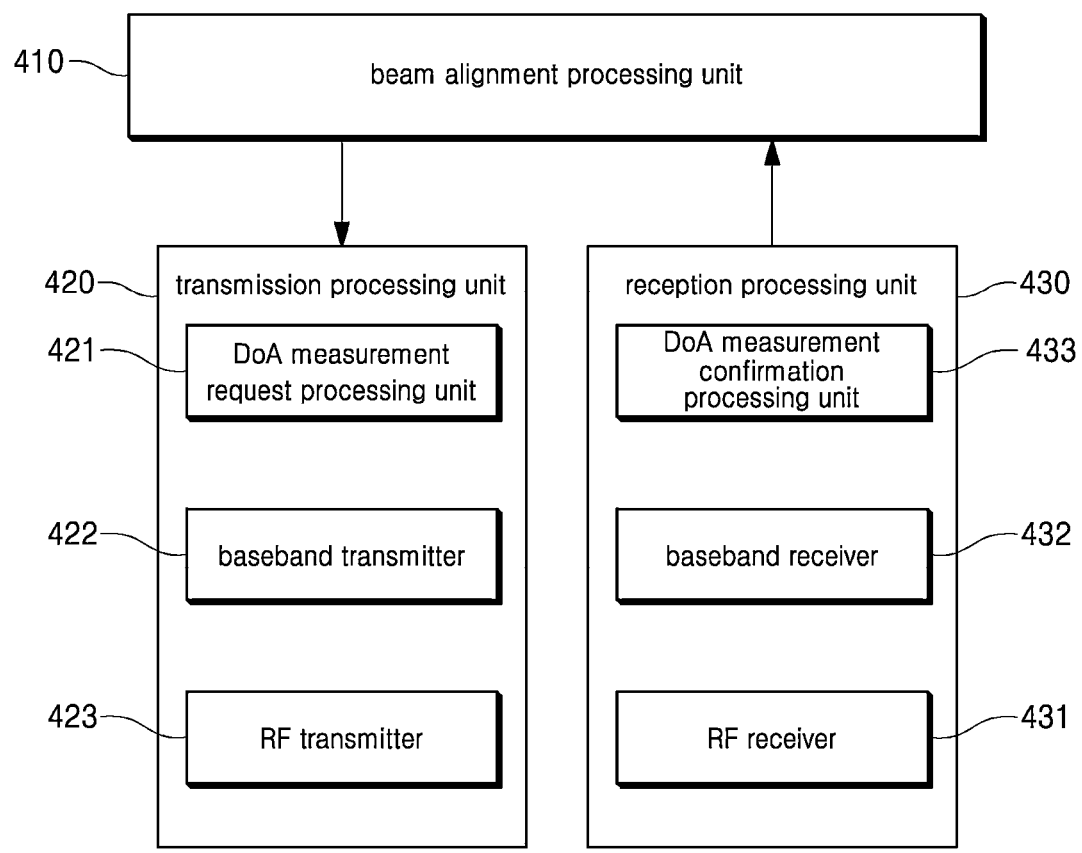
FIG. 4 is a conceptual diagram for describing functional components of the transmitting node.

FIG. 4 is a conceptual diagram for describing functional components of the transmitting node.

Referring to FIG. 4, the transmitting node may include a beam alignment processing unit 410, a transmission processing unit 420, and a reception processing unit 430. The transmission processing unit 420 may include a DoA measurement request processing unit 421, a baseband transmitter 422, and a radio frequency (RF) transmitter 423. The reception processing unit 430 may include an RF receiver 431, a baseband receiver 432, and a DoA measurement confirmation processing unit 433.

The components illustrated in FIG. 4 may be a portion of the functional components of the transceiver 230 and the processor 210 described in FIG. 2. For example, the transmission processing unit 420 and the reception processing unit 430 may be a portion of the functional components of the transceiver 230, and the beam alignment processing unit 410 may be a portion of the functional components of the processor 210. In another example, the transceiver 230 described in FIG. 2 may include only the baseband transmitter 422 and the RF transmitter 423 of the transmission processing unit 420 and only the RF receiver 431 and the baseband receiver 432 of the reception processing unit 430. In this case, the DoA measurement request processing unit 421, the DoA measurement confirmation processing unit 433, and the beam alignment processing unit 410 may all be a portion of the functional components of the processor 210.

The operations of the respective functional components in FIG. 4 will be described below.

The beam alignment processing unit 410 may perform overall control to determine the direction 303 of the receiving node 320 based on the two-step procedure according to the present disclosure. For example, the beam alignment processing unit 410 may control transmission of signals to specific partitioned areas as described in FIG. 3B and control the operation to determine the partitioned area where the receiving node 320 is located based on the signals received from those partitioned areas. Additionally, the beam alignment processing unit 410 may control the operation to determine the detailed direction of the receiving node within the partitioned area. The beam alignment processing unit 410 may also control a series of operations to align the beams based on the DoA measurement value received from the receiving node. More specific control operations by the beam alignment processing unit 410 will be described in more detail with reference to the accompanying drawings.

The transmission processing unit 420 may transmit beams according to the present disclosure to determine the direction 303 of the receiving node 320 based on the control of the beam alignment processing unit 410. For example, the DoA measurement request processing unit 421 may generate signals to be transmitted through the beams for DoA measurement as described in FIG. 3C. In other words, the DoA measurement request processing unit 421 may generate a first signal (or sequence) to be transmitted through the first beam 331, a second signal (or sequence) to be transmitted through the second beam 332, and a third signal (or sequence) to be transmitted through the third beam 333. In this case, the first signal may be, for example, a preamble signal (or sequence), and the second and third signals may be signals (or sequences) generated using the first signal as described in Equation 2 above. The generated first, second, and third signals may be transmitted through the first beam 331, the second beam 332, and the third beam 333, respectively. A method of transmitting the first, second, and third signals will be described in more detail in the accompanying drawings.

The baseband transmitter 422 may encode and modulate digital data into the first signal, second signal, and third signal, which are baseband signals, and then upconvert them to an RF band. The baseband transmitter 422 may provide the up-converted RF signals to the RF transmitter 423. The RF transmitter 423 may power-amplify the up-converted RF signals and output the power-amplified signals through the corresponding antennas. Therefore, by transmitting signals through the respective antennas, the RF transmitter 423 may form the first beam 331, the second beam 332, and the third beam 333.

The reception processing unit 430 may obtain DoA information. More specifically, the RF receiver 431 may receive RF signals through the antennas, amplify them with low noise, and provide them to the baseband receiver 432. The baseband receiver 432 may convert the low-noise amplified RF signals to baseband signals and convert them to digital data. Additionally, the baseband receiver 432 may demodulate and decode the received signals. The decoded digital data may be provided to the DoA measurement confirmation processing unit 433. The DoA measurement confirmation processing unit 433 may obtain information on a DoA based on the signals received from the receiving node. In the present disclosure, the DoA information may be information generated by measuring the first beam to the third beam transmitted by the transmitting node 310. The reception processing unit 430 may receive the DoA information and provide it to the beam alignment processing unit 410.

The beam alignment processing unit 410 may perform beam alignment based on the DoA information received from the reception processing unit 430.

Figure 5:
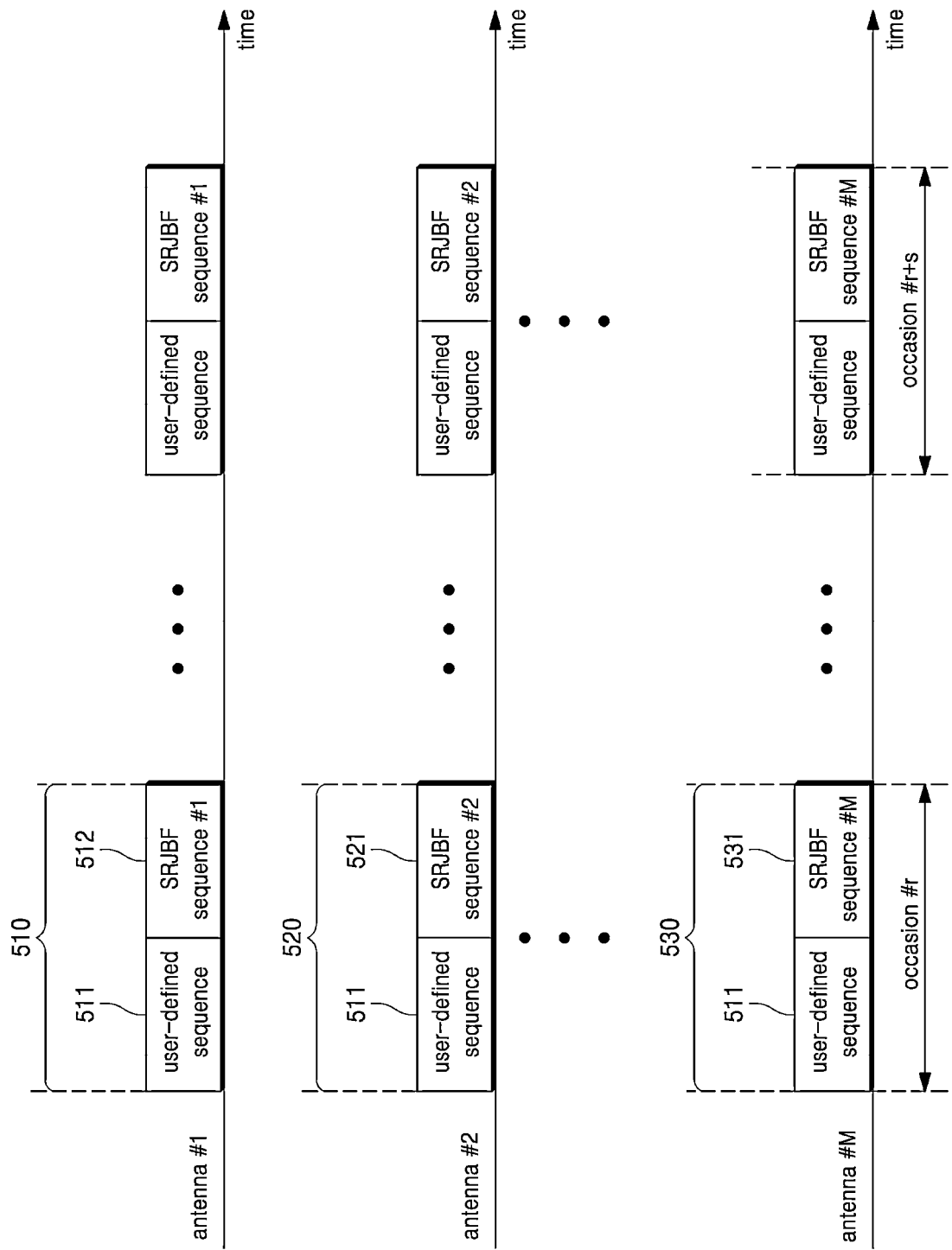
FIG. 5 is a conceptual diagram for describing transmission frames for SRJBF transmitted by the transmitting node.

FIG. 5 is a conceptual diagram for describing transmission frames for SRJBF transmitted by the transmitting node.

Referring to FIG. 5, the sequences transmitted by the transmitting node 310 may be different sequences for the respective antenna. In FIG. 5, as an example, a case where the transmitting node 310 has M antennas is illustrated.

A signal transmitted through an antenna #1 may be configured with a first frame 510 including a user-defined sequence 511 and an SRJBF sequence #1 512. A signal transmitted through an antenna #2 may be configured with a second frame 520 including the user-defined sequence 511 and an SRJBF sequence #2 521. A signal transmitted through an antenna #M may be configured with an M-th frame 530 including the user-defined sequence 511 and an SRJBF sequence #M 531. In other words, each of the frames 510, 520, and 530 according to the present disclosure may be composed of a pair of the user-defined sequence 511 and the SRJBF sequence 512, 521, or 531 corresponding to each antenna. For convenience of description, the frames 510, 520, and 530 transmitted for the respective antennas will be referred to as 'antenna-specific DoA measurement request frames'.

The user-defined sequence 511 included in each of the antenna-specific DoA measurement request frames 510, 520, and 530 may be the symbols $X_{k,m}^{ref}$ generated by Equation 1 described above and may be allocated to the entire frequency band in the frequency domain, in other words, to all subcarriers.

The SRJBF sequences 512, 521, and 531 included in the respective antenna-specific DoA measurement request frames 510, 520, and 530 may be the symbols $X_{k,m}^{SRJB}$ generated by Equation 2. As described in Equation 2 above, the symbols $X_{k,m}^{SRJB}$ may include $X_{k,m}^{L}$, which is the third signal (or sequence) transmitted through the left-side beam (i.e. third beam 333), and $X_{k,m}^{R}$, which is the second signal (or sequence) transmitted through the right-side beam (i.e. second beam 332). In this case, $X_{k,m}^{L}$ and $X_{k,m}^{R}$ may be allocated at the same ratio in the frequency domain. If $X_{k,m}^{L}$ and $X_{k,m}^{R}$ are allocated at the same ratio in the frequency domain, $X_{k,m}^{L}$ may be allocated to odd-numbered subcarriers, and $X_{k,m}^{R}$ may be allocated to even-numbered subcarriers. Alternatively, $X_{k,m}^{R}$ may be allocated to odd-numbered subcarriers, and $X_{k,m}^{L}$ may be allocated to even-numbered subcarriers.

The antenna-specific DoA measurement request frames 510, 520, and 530 described above may be generated by the DoA measurement request processing unit 421 under the control of the beam alignment processing unit 410. The antenna-specific DoA measurement request frames 510, 520, and 530 generated by the DoA measurement request processing unit 421 may be formed into the reference beam, left-side beam, and right-side beam through the baseband transmitter 422 and RF transmitter 423 as described in FIG. 3C in a preamble transmission occasion. These beams, thus formed, may be transmitted to the receiving node 320 through an air channel.

As shown in FIG. 5, the antenna-specific DoA measurement request frames 510, 520, and 530 may be transmitted in an occasion #r and then additionally transmitted in other occasions. The other occasions may be consecutive from an occasion immediately following the occasion in which the antenna-specific DoA measurement request frames were transmitted, and the antenna-specific DoA measurement request frames 510, 520, and 530 may be transmitted a predetermined number of times or as many times as agreed with the receiving node.

In the OFDM wireless communication system, the pair of the user-defined sequence 511 and the SRJBF sequence 512, 521, or 531 included in the antenna-specific DoA measurement request frame 510, 520, or 530 may be allocated to different OFDM symbols or allocated together within a single OFDM symbol. For example, in the case of the antenna-specific DoA measurement request frame 510 transmitted through the antenna #1, the user-defined sequence 511 and SRJBF sequence #1 512 may be allocated within the same OFDM symbol or to different OFDM symbols. If the user-defined sequence 511 and SRJBF sequence #1 512 are allocated to different OFDM symbols, the OFDM symbol(s) transmitting the user-defined sequence 511 and the OFDM symbol(s) transmitting the SRJBF sequence #1 512 may be adjacent to each other.

For convenience of description, the present disclosure assumes that sequences of a pair included in a single antenna-specific DoA measurement request frame are each allocated to adjacent OFDM symbols.

Figure 6:
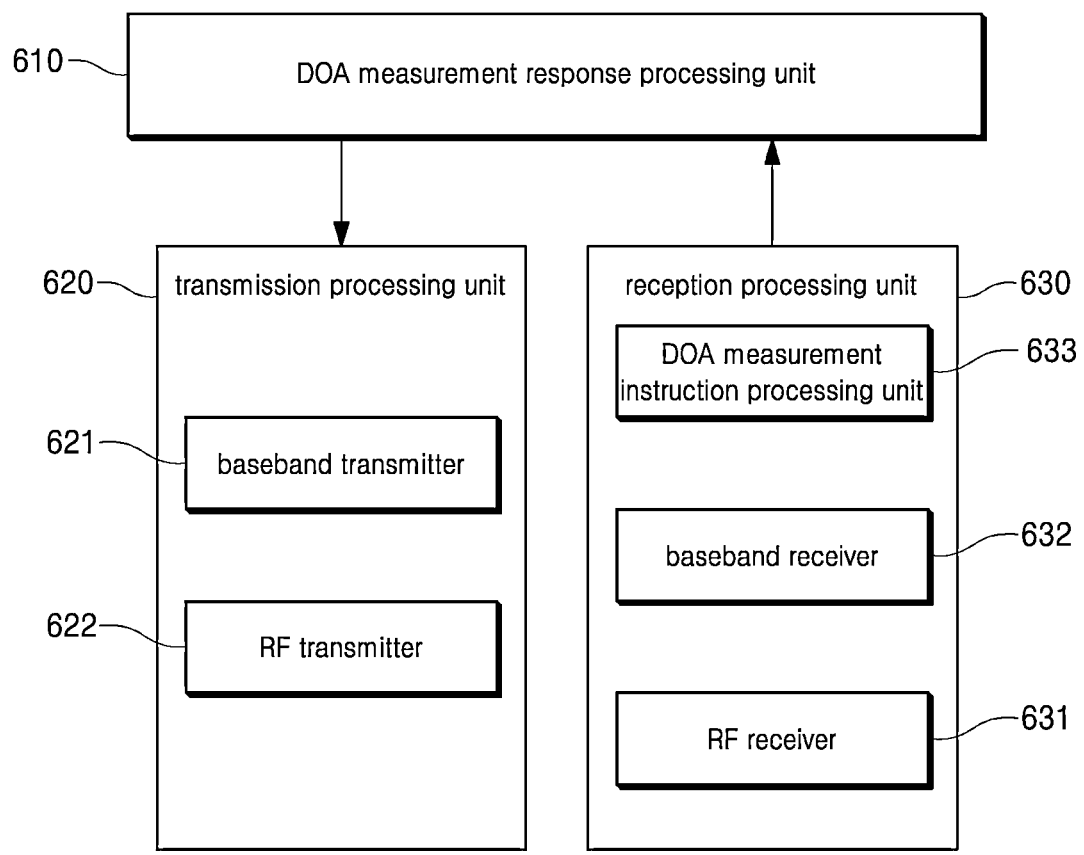
FIG. 6 is a conceptual diagram for describing functional components of the receiving node.

FIG. 6 is a conceptual diagram for describing functional components of the receiving node.

Referring to FIG. 6, the receiving node may include a DoA measurement response processing unit 610, a transmission processing unit 620, and a reception processing unit 630. The transmission processing unit 620 may include a baseband transmitter 621 and an RF transmitter 622. The reception processing unit 630 may include an RF receiver 631, a baseband receiver 632, and a DOA measurement instruction processing unit 633.

The components illustrated in FIG. 6 may be a portion of the functional components of the transceiver 230 and the processor 210 described n FIG. 2. For example, the transmission processing unit 620 and the reception processing unit 630 may be a portion of the functional components of the transceiver 230, and the DoA measurement response processing unit 610 may be a portion of the functional components of the processor 210. In another example, the transceiver 230 described in FIG. 2 may include only the baseband transmitter 621 and the RF transmitter 622 for the transmission processing unit 620 and only the RF receiver 631 and the baseband receiver 632 for the reception processing unit 630. In this case, the DoA measurement instruction processing unit 633 and the DoA measurement response processing unit 610 may both be a portion of the functional components of the processor 210.

The operations of the respective functional components of the reception processing unit 630 illustrated in FIG. 6 will be described below.

The RF receiver 631 of the reception processing unit 630 may receive the antenna-specific DoA measurement request frames 510, 520, and 530 from the transmitting node 320. As described in FIG. 3C, the antenna-specific DoA measurement request frames 510, 520, and 530 may be transmitted from the transmitting node 310 to the receiving node 320 through the first beam 331 formed in the reference direction 301, the second beam 332 tilted to the right by a preset angle within the boundary angle $\Phi_{Th}$ from the reference direction 301, and the third beam 333 tilted to the left by a preset angle within the boundary angle $\Phi_{Th}$ from the reference direction 301.

The RF receiver 631 may receive RF signals through the antennas, amplify them with low noise, and provide them to the baseband receiver 632. The baseband receiver 632 may convert the low-noise amplified RF signals into baseband signals and then into digital data. Additionally, the baseband receiver 632 may demodulate and decode the received signals. The decoded digital data may be provided to the DoA measurement instruction processing unit 633.

The DoA measurement instruction processing unit 633 may calculate a DoA measurement value ρ using the demodulated signals, as in Equation 4 below according to definition of Equation 3. The DoA measurement value ρ may be understood as a DoA correlation value $$<\vec{X}, \vec{Y}> = \sum_{k \in P} X_k^* Y_k \qquad \text{[Equation 3]}$$

$$\rho = \frac{<\vec{Y}^{ref}, \vec{Y}^{SRJB}>}{<\vec{Y}^{ref}, \vec{Y}^{ref}> \cdot <\vec{Y}^{SRJB}, \vec{Y}^{SRJB}>} \qquad \text{[Equation 4]}$$

In Equation 3, $\vec{X}$ may a frequency-domain sequence pre-known in the OFDM system with multiple subcarriers, which may mean the user-defined sequence described in FIG. 5. $\vec{Y}$ may be a received frequency domain signal, meaning the demodulated signal. Accordingly, $\vec{Y}_{ref}$ may be a frequency domain signal received through the reference beam 331, and $\vec{Y}^{SRJB}$ may be frequency domain signals received through the second beam 332 and the third beam 333 transmitted in the SRJBF form.

The operation $<\vec{X}, \vec{Y}>$ refers to an inner product of the two signals, which may mean a correlation coefficient between the two signals. X* refers to a complex conjugate of X.

Based on the definition of Equation 3, the DoA measurement value ρ may be calculated as shown in Equation 4. The calculation of Equation 4 involves computing the DoA measurement value ρ, which has an inner product of the known reference sequence and the received SRJBF sequence as a numerator, and a product of an inner product of the known reference sequence and the received reference sequence and an inner product of the known SRJBF sequence and the received SRJBF sequence as a denominator.

The DoA measurement instruction processing unit 633 may perform operations as shown in Equation 5, and based on the calculations in Equation 5, the relative direction value n may be determined as shown in Equation 5.

$$\gamma_L = \sum_{k \in P_L} (Y_k^{SRJB})^* Y_k^{SRJB} \qquad \text{[Equation 5]}$$

$$\gamma_R = \sum_{k \in P_R} (Y_k^{SRJB})^* Y_k^{SRJB}$$

$$\eta = \begin{cases} 0, & \gamma_L < \gamma_R \\ 1, & \gamma_L > \gamma_R \end{cases} \qquad \text{[Equation 6]}$$

In Equation 5, $\gamma_L$ may refer to a sum of inner products of the sequences transmitted through the beam located to the left of the reference direction 301 as described in Equation 2 and FIG. 5, and $\gamma_R$ may refer to a sum of inner products of the sequences transmitted through the beam located to the right of the reference direction 301 as described in Equation 2 and FIG. 5.

As shown in Equation 6, $\gamma_L$ being smaller than $\gamma_R$ means that the relative direction value η is 0, indicating that the opposite node is located to the right of the direction of the reference beam (i.e. first beam 331) as illustrated in FIC 3C. On the other hand, $\gamma_L$ being greater than $\gamma_R$ means that the relative direction value η is 1, indicating that the opposite node is located to the left of the direction of the reference beam (i.e. first beam 331) as illustrated in FIG. 3C.

The DoA measurement instruction processing unit 633 may provide the DoA measurement value ρ calculated as in Equation 4 and the relative direction value η to the DoA measurement response processing unit 610. The DoA measurement response processing unit 610 may configure DoA information, including the DoA measurement value ρ and the relative direction value n, into a DoA measurement response message, and provide it to the transmission processing unit 620.

The baseband transmitter 621 of the transmission processing unit 620 may encode and modulate digital data (i.e. the DoA measurement response message), then up-convert it to the RF band and provide the up-converted RF signal to the RF transmitter 622. The RF transmitter 622 may power-amplify the up-converted RF signals and output each of the power-amplified signals through the corresponding antennas. In other words, the DoA information, including the DoA measurement value ρ and the relative direction value n, as described in FIG. 4, may be transmitted to the transmitting node 310. The DoA information may also be transmitted as being included in a measurement report message. For example, when the transmitting node 310 instructs the receiving node 320 to report the measurement of the reference signal, the DoA information may be transmitted in form of the measurement report message. In this case, the receiving node 320 may transmit the DoA information to the transmitting node 310 without performing beamforming. This is because the exact direction between the transmitting node 310 and the receiving node 320 has not been configured, and thus information may be lost.

Furthermore, since the receiving node 320 does not perform beamforming to the transmitting node 310, the transmitting node 310 may also not perform beamforming when receiving the DoA information from the receiving node 320.

In another example, the receiving node 320 may transmit the DoA measurement response message including the DoA information to the transmitting node 310 through an out-of-band channel.

Based on the operations described above, the transmitting node 310 may receive the DoA measurement response message including the DoA information from the receiving node 320. The transmitting node 310 may receive the DoA measurement response message through the antenna in the RF band, down-convert it to the baseband band, and demodulate and decode it to obtain the DoA measurement response message in form of digital data. The transmitting node 310 may then obtain the DoA information included in the DoA measurement response message, specifically the DoA measurement value $\rho$ and the relative direction value $\eta$.

The transmitting node 310 may perform beam alignment based on the DoA measurement value $\rho$ and the relative direction value $\eta$. In this case, the DoA information included in the DoA measurement response message received from the receiving node 320, specifically the DoA measurement value $\rho$ and the relative direction value $\eta$, may use a codebook. For example, the DoA measurement value $\rho$ and the relative direction value $\eta$ may be mapped through a preconfigured codebook, which may be shared in advance between the transmitting node 310 and the receiving node 320. When the codebook is shared in advance between the transmitting node 310 and the receiving node 320, the receiving node 320 may only need to transmit information on the mapped codebook to the transmitting node 310, thereby reducing system overhead for transmissions from the receiving node 320 to the transmitting node 310. The present disclosure does not impose specific constraints on a method of constructing the codebook. In other words, various forms of codebooks using the DoA measurement value $\rho$ and the relative direction value $\eta$ may be used in the present disclosure. Therefore, additional details related to the codebook will be omitted in the present disclosure.

In the present disclosure, the transmitting node 310 may select one of the partitioned areas using coarse beams described in FIG. 3B based on the DoA information received from the receiving node 320. Then, the transmitting node 310 may adjust the direction of the receiving node 320 within the selected partitioned area based on the DoA information. Through this process, the transmitting node 310 may perform alignment of a beam to transmit to the receiving node 320.

Figure 7:
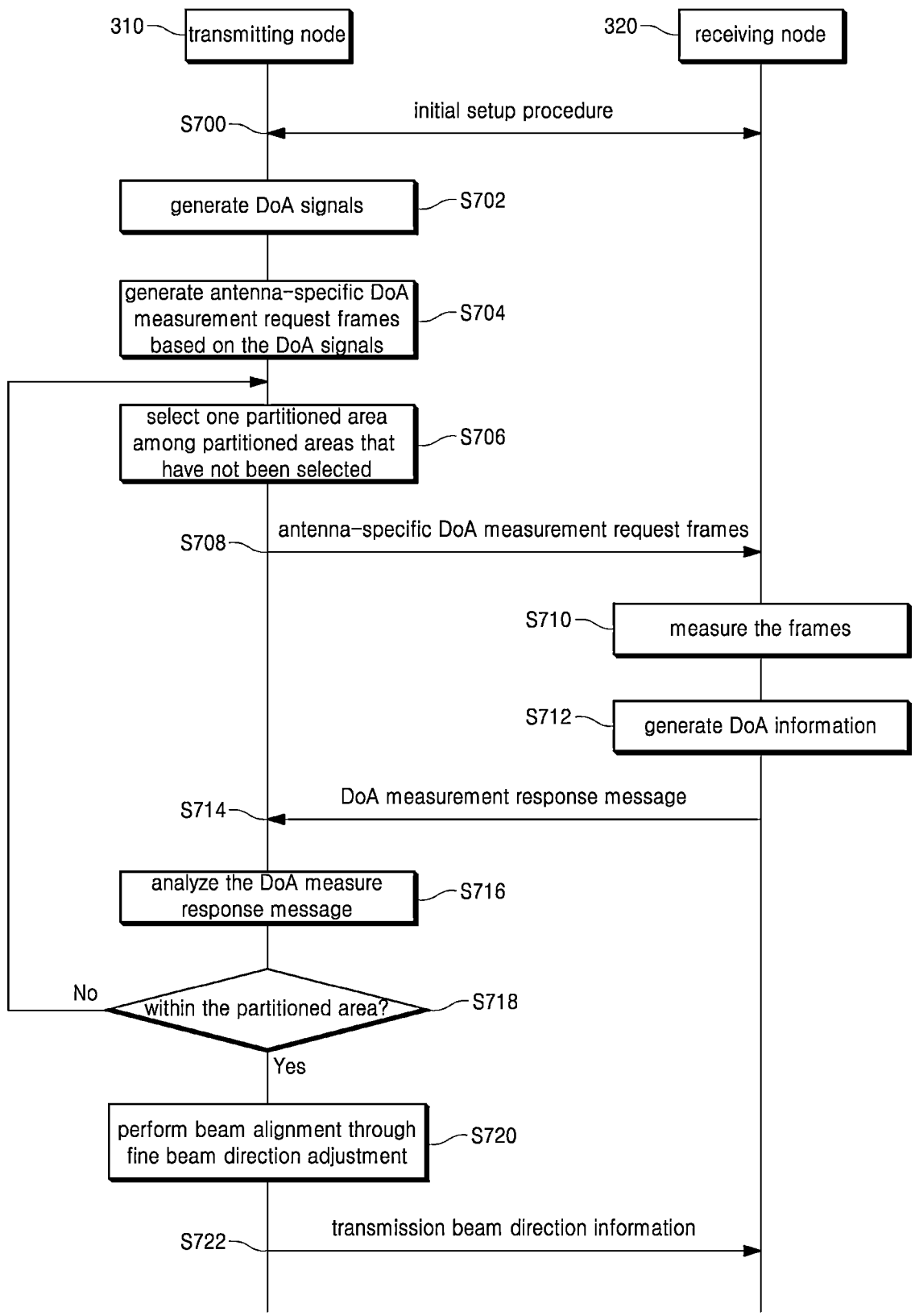
FIG. 7 is a sequence chart for describing direction search and beam alignment performed by the transmitting node with respect to the receiving node.

FIG. 7 is a sequence chart for describing direction search and beam alignment performed by the transmitting node with respect to the receiving node.

In step S700, the transmitting node 310 and the receiving node 320 may perform an initial setup procedure. The initial setup procedure may include a signaling procedure in which the transmitting node 310 requests beam alignment for transmitting signals (or data) to the receiving node 320 through beamforming, and a signaling procedure in which the receiving node 320 accepts the beam alignment request from the transmitting node 310. Additionally, the initial setup procedure may include a procedure of providing information on the absolute polar coordinates of the transmitting node 310 to the receiving node 320 as described in FIG. 3A. If the reference direction 301 of the absolute polar coordinates is configured as the north direction by the system or by standard specifications, the transmitting node 310 may not provide information on the absolute polar coordinates to the receiving node 320 during the initial setup procedure. In addition, if the information on the absolute polar coordinates includes the location information of the transmitting node 310 and the receiving node 320, there may be a procedure of exchanging each other's location information by transmitting their respective location information to the other side.

During the initial setup procedure, the transmitting node 310 may provide the receiving node 320 with information on the search range and the number of partitioned areas within the search range. Through this, the receiving node 320 may confirm the search range and the partitioned areas. Additionally, the transmitting node 310 may provide the receiving node 320 with information on sequences to be transmitted in the partitioned areas through the coarse beams, for example, preamble sequence information.

During the initial setup procedure, the transmitting node 310 may also provide the receiving node 320 with basic parameters for determining the direction of the coarse beam. The parameters for determining the beam direction may include information on the first partitioned area for searching for the receiving node 320 within the configured search range, that is, the initial beam direction. Additionally, the parameters for determining the beam direction may include information on how to select partitioned areas among the partitioned areas that have not been searched after the first partitioned area has been searched. For example, in the example of FIG. 3B, if the first partitioned area is the partitioned area #0 ($Z_0$) located furthest to the right from the reference direction 301, the subsequent partitioned areas may follow a rule of sequentially progressing to the left. There may be various methods for selecting partitioned areas, and the present disclosure does not impose any specific restrictions on the method for selecting partitioned areas.

Additionally, during the initial setup procedure, information on the occasion in which the DoA measurement request frames are transmitted and a periodicity of the occasions may be exchanged.

In step S702, the transmitting node 310 may generate DoA signals (or sequences). Symbols for the DoA signals may be generated based on the schemes described in Equation 1 and Equation 2. Since this has been described above, redundant description will be omitted. In step S704, the transmitting node 310 may generate antenna-specific DoA measurement request frames based on the generated DoA signals or DoA sequences. As described in FIG. 5, for the antenna-specific DoA measurement request frames, the SRJBF sequences 512, 521, and 531 corresponding to the respective antennas may be generated in symbols consecutive to the user-defined sequence 511. The user-defined sequence 511 and the SRJBF sequences 512, 521, and 531 may be respectively mapped to the antenna-specific DoA measurement request frames 510, 520, and 530. Through this process, the antenna-specific DoA measurement request frames may be generated.

In step S706, the transmitting node 310 may select one of partitioned areas that have not been selected, in other words, one of partitioned areas where the direction search for beam alignment has not been performed yet. In the case of the first selection of a partitioned area, the first partitioned area described in the initial setup procedure may be selected. In the case of not the first selection of a partitioned area, the next partitioned area may be selected based on the scheme agreed upon in the initial setup procedure.

In step S708, the transmitting node 310 may transmit the antenna-specific DoA measurement request frames through a coarse beam in the corresponding partitioned area. In this case, since the coarse beam include the SRJBF beams as described above, the reference beam 331, the right-side beam 332 of the first beam 331, and the left-side beam 333 of the first beam 331 may be formed and transmitted as described in FIG. 3C. Additionally, the antenna-specific DoA measurement request frames may be transmitted in the pre-agreed occasion.

In step S708, the receiving node 320 may receive the antenna-specific DoA measurement request frames according to information on the pre-agreed occasion and the partitioned area, which is received from the transmitting node 310 during the initial setup procedure.

In step S710, the receiving node 320 may measure the received antenna-specific DoA measurement request frames. As described in FIGS. 5 and 6, the antenna-specific DoA measurement request frames may be received through the first beam 331 formed in the central direction of the partitioned area subject to direction search, the second beam 332 formed in the direction titled to the right of the first beam 331 within the partitioned area, and the third beam 333 formed in the direction tilted to the left of the first beam 331 within the partitioned area. These received beams may be measured. A frequency domain signal received through the first beam 331 and frequency domain signals received through the second beam 332 and the third beam 333 transmitted in the SRJBF form may be measured.

In step S712, the receiving node 320 may generate the DoA information. The DoA information may include the DoA measurement value $\rho$ and the relative direction value $\eta$, as described above. Additionally, the DoA measurement value $\rho$ may be obtained (or calculated) based on Equations 3 and 4 described above, and the relative direction value $\eta$ may be obtained (or calculated) based on Equations 5 and 6 described above.

In step S714, the receiving node 320 may transmit a DoA measurement response message including the DoA information to the transmitting node 310. In this case, the DoA measurement response message may be transmitted without being beamformed, or may be transmitted through an out-of-band channel, as described above. Therefore, in step S714, the transmitting node 310 may receive the DoA measurement response message transmitted by the receiving node 320.

In step S716, the transmitting node 310 may analyze the DoA measurement response message. The analyzing the DoA measurement response message may correspond to a procedure for identifying the DoA information, which includes the DoA measurement value $\rho$ and the relative direction value $\eta$.

In step S718, the transmitting node 310 may use the DoA measurement value $\rho$ from the DoA information analyzed in step S716 to check whether the receiving terminal 320 is within the partitioned area where the antenna-specific DoA measurement request frames were transmitted. If the receiving node 320 is within the partitioned area where the antenna-specific DoA measurement request frames were transmitted, the transmitting node 310 may perform beam alignment through fine beam direction adjustment in step S720.

On the other hand, if the receiving node 320 is not within the partitioned area where the antenna-specific DoA measurement request frames were transmitted, the transmitting node 310 may proceed to step S706. In this case, the transmitting node 310 may select the next partitioned area if the receiving node 320 is not within the partitioned area where the antenna-specific DoA measurement request frames were transmitted. An example of a method for selecting the next partitioned area will be described with reference to FIG. 3B as follows:

The transmitting node 310 may first select the partitioned area $Z_0$, which is the rightmost partitioned area in the search area, to search for the direction of the receiving node 320 among the partitioned areas. Then, the receiving node 310 may perform steps S708 to S718 as describe above. If a result of checking in step S718 indicates that the receiving node 320 is not within the first selected partitioned area $Z_0$, the transmitting node 310 may select the next partitioned area $Z_1$. In this manner, the search may be performed sequentially based on a specific direction. In another example, the search may be performed randomly, or a history may be used to prioritize the search of predictable partitioned areas. Additionally, when selecting subsequent partitioned areas, the second or third partitioned area may be selected based on changes in the DoA measurement value $\rho$.

Hereinafter, referring to FIG. 8, a method for determining whether the receiving terminal 320 is within the partitioned area where the antenna-specific DoA measurement request frames are transmitted will be described.

Figure 8:
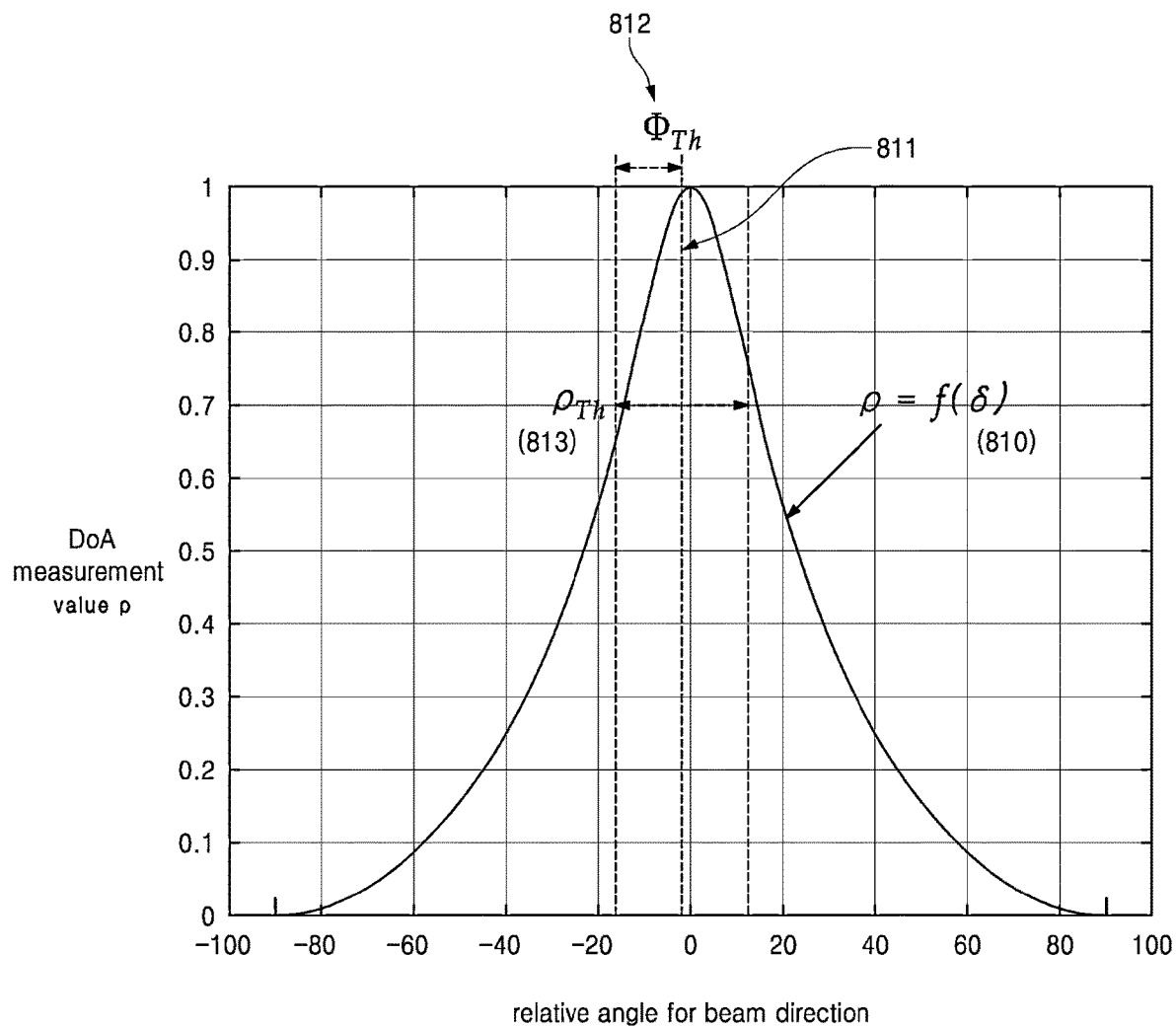
FIG. 8 is a graph illustrating a function of a DoA measurement value, which takes as an input a relative angle measured by the receiving node for a direction of a beam transmitted by the transmitting node having a ULA-type antenna.

FIG. 8 is a graph illustrating a function of a DoA measurement value, which takes as an input a relative angle measured by the receiving node for a direction of a beam transmitted by the transmitting node having a ULA-type antenna.

A function graph 810 of a DoA measurement value illustrated in FIG. 8 may show a change in the DoA measurement value $\rho$ with respect to the relative angle $\delta$ of the receiving node when it exactly matches the direction of the beam transmitted by the transmitting node 310. As described above, since the DoA measurement value $\rho$ may be a correlation value of the DoA, the correlation value of the DoA has the maximum value when the direction matches, and may sharply decrease when the direction does not match.

Therefore, the transmitting node 310 may first check whether the DoA measurement value $\rho$ is equal to or greater than a predetermined threshold value $\rho_{th}$ 813. If the DoA measurement value $\rho$ is equal to or greater than the predetermined threshold value $\rho_{th}$ 813, the transmitting node 310 may determine that the receiving node 320 is located within the partitioned area where the antenna-specific DoA measurement request frames were transmitted. The threshold value $\rho_{th}$ 813 may be set through experiments or actual measurements, or through various simulations.

Through the above-described method, the transmitting node 310 may quickly identify the partitioned area in which the receiving node is located.

The example of FIG. 8 illustrates a case where the receiving node 320 is offset by the relative angle $\delta$ within a specific partitioned area where the antenna-specific DoA measurement request frames were transmitted. In this case, the reference direction 811 may be the direction of the coarse beam in the partitioned area where the antenna-specific DoA measurement request frames were transmitted. Therefore, the receiving node 320 may be located in the direction offset by the relative angle $\delta$ from the direction of the coarse beam. If the relative angle $\delta$ is negative, it means that the receiving node 320 is located to the left of the direction of the beam formed by the transmitting node 310. If the relative angle $\delta$ is positive, it means that the receiving node 320 is located to the right of the direction of the beam formed by the transmitting node 310. If the relative angle $\delta$ is zero, it means that the receiving node 320 is located in the direction of the beam formed by the transmitting node 310.

The fine beam direction adjustment procedure performed in step S720 may use the following method.

The transmitting node 310 may transmit antenna-specific DoA measurement request frames to the receiving node 320 within the partitioned areas, and obtain multiple DoA measurement response messages from the receiving node 320 to obtain multiple DoA information. Then, the transmitting node 310 may estimate the relative angle δ with respect to the coarse beam's direction 811 using the DoA measurement value ρ and the relative direction value η included in the DoA information.

As shown in FIG. 8, the DoA measurement value ρ for the relative angle δ may be obtained using a lookup table based on actually measured information or using a relationship based on mathematical equations. In another example, the DoA measurement value ρ with respect to the relative angle δ may be obtained using nonlinear regression analysis or artificial neural networks. As shown in FIG. 8, except for a peak point, two different relative angles δ may be mapped to one DoA measurement value ρ. Therefore, in the present disclosure, when constructing the relationship between the relative angle δ and the DoA measurement value ρ, a lookup table for a relationship between a positive relative angle δ and a DoA measurement value ρ may be used, or an inverse function as shown in Equation 7 below may be used.

$$\delta = f^{-1}(\rho) \qquad \text{[Equation 7]}$$

Additionally, a sign of the relative angle δ may be determined using the relative direction value η included in the DoA information. Through this, a single relative angle δ for the DoA measurement value ρ may be determined.

Then, the new beam direction, in other words, the fine beam direction, may be determined using Equation 8 below.

$$\varphi_{New} = \begin{cases} \varphi_{Old} + f^{-1}(\rho), & \eta = 0 \\ \varphi_{Old} - f^{-1}(\rho), & \eta = 1 \end{cases} \qquad \text{[Equation 8]}$$

In Equation 8, $\varphi_{New}$ refers to the new beam direction, that is, the fine beam direction, and $\varphi_{Old}$ refers to the coarse beam direction for the partitioned area in which the receiving node 320 is located.

If the relative direction value (η) is 0, it means that the receiving node 320 is to the right of the coarse beam direction $\varphi_{Old}$, so the fine beam direction $\varphi_{New}$ needs to be adjusted by adding the beam direction correction value $f^{-1}(\rho)$ to the coarse beam direction $\varphi_{Old}$. If the relative direction value (η) is 1, it means that the receiving node 320 is to the left of the coarse beam direction $\varphi_{Old}$, so the fine beam direction $\varphi_{New}$ needs to be adjusted by subtracting the beam direction correction value $f^{-1}(\rho)$ from the coarse beam direction $\varphi_{Old}$.

Using the method described above, the fine beam direction may be adjusted. The fine beam direction $\varphi_{New}$ described above may be the direction $\theta_T$ where the receiving node 320 is located from the reference direction 301 illustrated in FIG. 3A. Therefore, the transmitting node 310 may align the transmission beam in the direction 303 of the receiving node 320 based on the direction $\theta_T$ where the receiving node 320 is located.

Referring again to FIG. 7, in step S722, the transmitting node 310 may transmit information on the transmission beam direction $\theta_T$ to the receiving node 320. Thus, in step S722, the receiving node 320 may receive information on the transmission beam direction $\theta_T$ from the transmitting node 310. The receiving node 320 may perform reception beamforming using information on the transmission beam direction $\theta_T$ transmitted from the transmitting node 310.

Additionally, to facilitate this calculation, the transmitting node 310 and the receiving node 320 may each calculate global positioning system (GPS) location information of the transmitting node 310 and GPS location information of the receiving node 320 measured using GPS devices. During the initial setup procedure in step S700, they may share each other's location information, that is, the absolute coordinates of the transmitting node 310 and the receiving node 320.

Meanwhile, to more accurately determine which partitioned area the receiving node 320 is located in, steps S706 to S718 may be repeated a predetermined number of times, for example, 2 or 3 times. However, if quick beam alignment is required, it may be performed without repeating steps S706 to S718.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a transmitting node, comprising:
exchanging, with a receiving node, configuration information for beam direction search;
generating direction of attention (DoA) measurement request frames based on the configuration information;

transmitting the DoA measurement request frames to the receiving node through a coarse beam in a partitioned area selected among partitioned areas within a beam search range, in a transmission occasion of the DoA measurement request frames based on the configuration information;

receiving a DoA measurement response message from the receiving node;

identifying whether the receiving node is located within the selected partitioned area based on DoA information included in the DoA measurement response message; and in response to the receiving node being located within the selected partitioned area, changing a beam direction for beam alignment based on the DoA information, wherein the DoA information includes a DoA measurement value obtained by measuring correlations with sequences included in the DoA measurement request frames and a relative direction value indicating a misaligned direction of the DoA measurement request frames.

2. The method according to claim 1, wherein the configuration information further includes at least one of a number of the partitioned areas within the beam search range, information on a first partitioned area in which the DoA measurement request frames are to be transmitted, or information on partitioned area selection criteria.

3. The method according to claim 1, wherein the configuration information further includes global positioning system (GPS) location information of the transmitting node and GPS location information of the receiving node.

4. The method according to claim 1, wherein when the DoA measurement value is equal to or greater than a preset threshold, the receiving node is determined to be located within the selected partitioned area.

5. The method according to claim 1, wherein the changing of the beam direction for beam alignment comprises:

mapping the DoA measurement value to previously-stored relative angle(s);

in response to two mapped relative angles existing, determining a direction of a relative angle using the relative direction value included in the DoA information; and adjusting the beam direction by the relative angle of the determined direction from a beam direction in which the DoA measurement request frames are transmitted.

6. The method according to claim 1, wherein the generating of the DoA measurement request frames comprises:

generating a first signal, a second signal, and a third signal for transmission to a partitioned area within the beam search range; and generating the DoA measurement request frames by mapping the first signal to frequency resources of a first symbol, and equally mapping the second signal and the third signal to frequency resources of the second symbol.

7. The method according to claim 6, wherein the first symbol and the second symbol are consecutive symbols, the second signal is mapped to odd-numbered frequency resources of the second symbol, and the third signal is mapped to even-numbered frequency resources of the second symbol.

8. The method according to claim 1, wherein the DoA measurement request frames are respectively transmitted through a first beam transmitted to a center of the selected partitioned area, a second beam deviated by a predetermined angle to a right of the first beam within the selected partitioned area, and a third beam deviated by the predetermined angle to a left of the first beam within the selected partitioned area.

9. The method according to claim 1, further comprising: transmitting information on the changed beam direction to the receiving node.

10. A method of a receiving node, comprising:

exchanging, with a transmitting node, configuration information for beam direction search;

receiving direction of attention (DoA) measurement request frames through a coarse beam in an occasion based on the configuration information;

calculating a DoA measurement value obtained by measuring the received DoA measurement request frames and a relative direction value indicating a misaligned direction of the DoA measurement request frames;

transmitting a DoA measurement response message including the DoA measurement value and the relative direction value to the transmitting node; and communicating with the transmitting node based on the DoA measurement response message.

11. The method according to claim 10, further comprising:

receiving, from the transmitting node, beam direction information for the communication; and performing reception beamforming to receive a first signal from the transmitting node and transmission beamforming to transmit a second signal to the transmitting node based on the beam direction information.

12. A transmitting node comprising at least one processor, wherein the at least one processor causes the transmitting node to perform:

exchanging, with a receiving node, configuration information for beam direction search;

generating direction of attention (DoA) measurement request frames based on the configuration information;

transmitting the DoA measurement request frames to the receiving node through a coarse beam in a partitioned area selected among partitioned areas within a beam search range, in a transmission occasion of the DoA measurement request frames based on the configuration information;

receiving a DoA measurement response message from the receiving node;

identifying whether the receiving node is located within the selected partitioned area based on DoA information included in the DoA measurement response message; and in response to the receiving node being located within the selected partitioned area, changing a beam direction for beam alignment based on the DoA information, wherein the DoA information includes a DoA measurement value obtained by measuring correlations with sequences included in the DoA measurement request frames and a relative direction value indicating a misaligned direction of the DoA measurement request frames.

13. The transmitting node according to claim 12, wherein the configuration information further includes at least one of a number of the partitioned areas within the beam search range, information on a first partitioned area in which the DoA measurement request frames are to be transmitted, or information on partitioned area selection criteria.

14. The transmitting node according to claim 12, wherein the configuration information further includes global positioning system (GPS) location information of the transmitting node and GPS location information of the receiving node.

15. The transmitting node according to claim 12, wherein the at least one processor further causes the transmitting node to perform: in response to the DoA measurement value being equal to or greater than a preset threshold, determining that the receiving node is located within the selected partitioned area.

16. The transmitting node according to claim 12, wherein in the changing of the beam direction for beam alignment, the at least one processor further causes the transmitting node to perform:
mapping the DoA measurement value to previously-stored relative angle(s);
in response to two mapped relative angles existing, determining a direction of a relative angle using the relative direction value included in the DoA information; and
adjusting the beam direction by the relative angle of the determined direction from a beam direction in which the DoA measurement request frames are transmitted.

17. The transmitting node according to claim 12, wherein in the generating of the DoA measurement request frames, the at least one processor further causes the transmitting node to perform:
generating a first signal, a second signal, and a third signal for transmission to a partitioned area within the beam search range; and
generating the DoA measurement request frames by mapping the first signal to frequency resources of a first symbol, and equally mapping the second signal and the third signal to frequency resources of the second symbol.

18. The transmitting node according to claim 17, wherein the first symbol and the second symbol are consecutive symbols, the second signal is mapped to odd-numbered frequency resources of the second symbol, and the third signal is mapped to even-numbered frequency resources of the second symbol.

19. The transmitting node according to claim 12, wherein the DoA measurement request frames are respectively transmitted through a first beam transmitted to a center of the selected partitioned area, a second beam deviated by a predetermined angle to a right of the first beam within the selected partitioned area, and a third beam deviated by the predetermined angle to a left of the first beam within the selected partitioned area.

20. The transmitting node according to claim 12, wherein the at least one processor further causes the transmitting node to perform: transmitting information on the changed beam direction to the receiving node.

* * * * *